United States Patent [19]

O'Connor

[11] Patent Number: 5,165,748
[45] Date of Patent: Nov. 24, 1992

[54] EXTENDED VEHICLE VISOR

[76] Inventor: Michael J. O'Connor, 3133 Trinity Dr., Ventura, Calif. 93003

[21] Appl. No.: 895,248

[22] Filed: Jun. 8, 1992

Related U.S. Application Data

[63] Continuation-in-part of Ser. No. 742,378, Aug. 8, 1991, abandoned.

[51] Int. Cl.⁵ .............................................. B60J 3/00
[52] U.S. Cl. .................................. 296/97.6; 296/97.8; 160/370.2
[58] Field of Search ................... 296/97.8, 97.6, 97.1; 160/370.2

[56] References Cited

U.S. PATENT DOCUMENTS

| | | | |
|---|---|---|---|
| 2,542,409 | 2/1951 | Guenther | 296/97.6 |
| 2,818,298 | 12/1957 | Goeske | 296/97.8 |
| 2,833,591 | 5/1958 | Kurtzke | 296/97.6 |
| 2,894,596 | 7/1959 | Williams | 296/97.2 |
| 2,972,819 | 3/1960 | Johnson | 296/97.8 |
| 3,003,812 | 10/1961 | Haughland | 296/97.8 |
| 3,008,757 | 11/1961 | Sinnett | 296/97.8 |
| 3,371,955 | 3/1968 | Herrington | 296/97.8 |
| 4,023,855 | 5/1977 | Janata | 296/97.6 |
| 4,526,415 | 7/1985 | Jardine | 296/97.6 |
| 4,558,899 | 12/1985 | Chu | 296/97.8 |
| 4,652,039 | 3/1987 | Richards | 296/97.1 |
| 4,722,176 | 12/1988 | Karford | 296/97.8 |
| 4,801,170 | 1/1989 | Moore | 296/97.5 |
| 4,824,161 | 4/1989 | Lee | 296/97.8 |
| 4,923,238 | 5/1990 | Morgulis | 296/97.6 |
| 4,947,920 | 8/1990 | Moli | 160/84.1 |

FOREIGN PATENT DOCUMENTS 2825516 12/1978 Fed. Rep. of Germany .
2-93222 11/1989 Japan .

Primary Examiner—Robert R. Song
Attorney, Agent, or Firm—Robert M. Wallace

[57] ABSTRACT

An extended sun visor accessory for motor vehicle including central and side panels that are foldable into an inoperative position wherein the accessory may be stored in a space similar to that of a conventional vehicle sun visor employed for aircraft, shipcraft and various motor vehicles when inoperative and extended to cover a windshield for the vehicle. The extended sun visor panels are foldable along both vertical and horizontal fold lines, extending from the conventional vehicle sun visor first along horizontal folds that are parallel to the longitudinal axis of the vehicle sun visor and then extending along vertical fold lines that are perpendicular to the longitudinal axis of the vehicle sun visor to cover virtually the entire windshield thereof. Securing means retains the accessory when inoperative. The accessory may be constructed to attach to a vehicle sun visor or the vehicle sun visor may be constructed to house the invention within a recessed area contained within the vehicle sun visor.

11 Claims, 3 Drawing Sheets

EXTENDED VEHICLE VISOR

This is a continuation-in-part of application Ser. No. 07/742,378 filed Aug. 8, 1991, now abandoned.

BACKGROUND OF THE INVENTION

1. Field of the Invention

The invention relates to sun visors for vehicles, and more particularly to sun visors which are collapsible for storage and extendible for use to reduce solar penetration through transparent windshields.

2. Description of the Prior Art

It is a well known fact that motor vehicles standing in the sun become extremely heated inside the vehicles as a result of solar radiation entering through the glass portions of the vehicle. For this reason, many forms of sun shields have been devised which prevent radiation from the sun entering through the windows of motor vehicles. However, the various types of sun shields devised have been cumbersome to use and inconvenient to store when not in use. It is generally accepted that existing sun shields have not been effective in eliminating sufficiently large amounts of light. Therefore, there exists a need within the art to create a sun shield that may be conveniently stored when not in use, that may be used without being cumbersome, and that may sufficiently reduce the amount of light that would otherwise enter the motor vehicle.

SUMMARY OF THE INVENTION

According to the present invention, there is provided an extended visor for motor vehicles comprising: a planar member formed from a plurality of panels, the panels are constructed in order to be first foldable in a lateral direction and second in a vertical direction, or a direction which is orthogonal to the first direction; and attachment means capable of securing the planar member to a built in sun visor of a vehicle. The plan member consists of a series of panels, some being foldable in a vertical direction and others being foldable in a horizontal or lateral direction, visor for convenient storage above the vehicle sun visor. All the panels fold upon each other to close the extended visor for convenient storage above the vehicle sun visor. The panels having vertical folds, provide for shielding from sun radiation along the center and outer edges of a motor vehicle windshield, while the panels having horizontal folds cover the major portion of the windshield.

In one embodiment of the invention, the extended visor folds into place adjacent to a conventional vehicle sun visor where it is secured in the folded position by straps having means to secure the extended visor while not in use. The straps may be leather, rubber or nylon and are secured by fasteners which can be constructed of either metal snaps, V Velcro snaps or plastic fasteners.

Another embodiment of the invention teaches using the invention in a vehicle that has what is essentially a conventional sun visor for a motor vehicle with a recessed area therein for storing the extended visor while not in use. In this embodiment of the invention a latching mechanism is employed to secure the extended visor into the recessed area while not being used.

OBJECT OF THE INVENTION

It is therefore an object of the invention to provide a means of eliminating radiation from sunlight from entering a motor vehicle while not in use, that is effective and economical.

It is further the object of this invention to provide a sun visor that can be stored in a simple, easy to reach place while not in use and be deployed for use in a manner that is not cumbersome.

It is still yet a further object of this invention to provide a sun visor that is easily manufactured from materials presently available.

DESCRIPTION OF THE PREFERRED EMBODIMENT

Figure 1A:
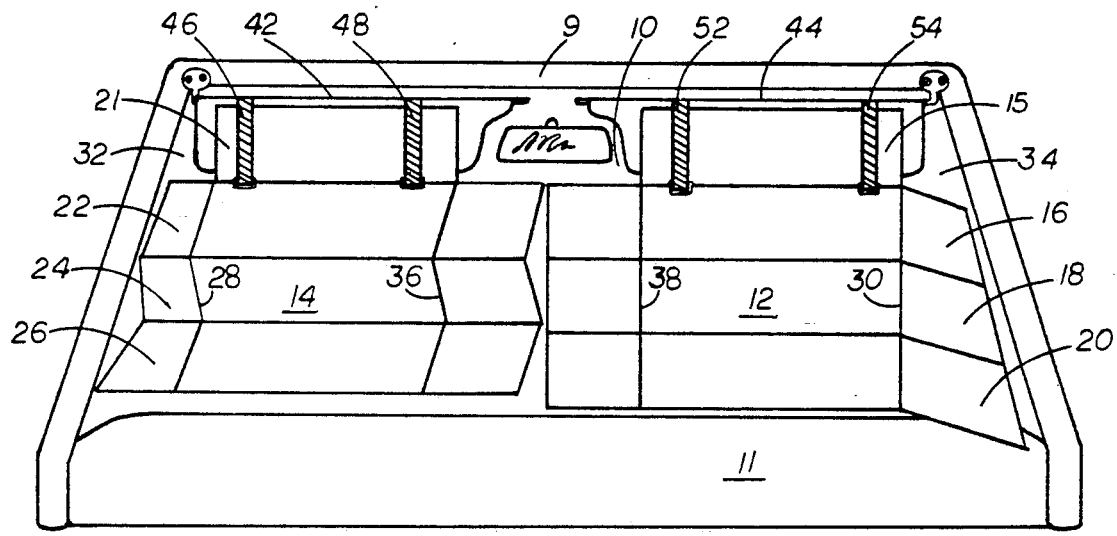
FIG. 1A illustrates the invention as extended for covering a front windshield in a motor vehicle.

Referring to FIG. 1A, a typical application of the invention is illustrated wherein the extended visor 2 is opened across the front window 10 of a vehicle. Extended visor 2 is composed of two halves, right visor 12 and left visor 14. Right visor 12 is formed from a plurality of panels 16, 18, and 20, which unfold vertically down from window jam 9 of vehicle window 10 and extend to dashboard 11. Horizontal outside fold 30 is provided to unfold horizontally to cover side window 34 and horizontal inside fold 38 unfolds from right visor 12 to cover any portions of window 10 that have been left uncovered as indicated by central open area 40. Left visor 14 is formed in a similar manner from a plurality of panels 22, 24, and 26 that unfold vertically downward. Horizontal outside fold 28 unfolds to cover side window 32 and horizontal inside fold 36 being provided to cover any remaining central open area 40 of window 10.

One advantage of the invention which is inherent in the foregoing structure is that the horizontal folds are held fully unfolded whenever a portion (i.e., a side panel) of the shield is folded along a vertical fold line at least at a slight acute angle with respect to the center or major portion of the shield. (The effect of the acute angle holding all of the horizontal fold lines of the shield fully unfolded is illustrated in the right-side shield 12 of FIG. 1A of the application).

Right visor 12 is secured to vehicle sun visor 44 by attachment means which in the preferred embodiment are flexible bands 52, 54 and similarly left visor 14 is secured to vehicle sun visor 42 by flexible bands 46 and 48.

Figure 1B:
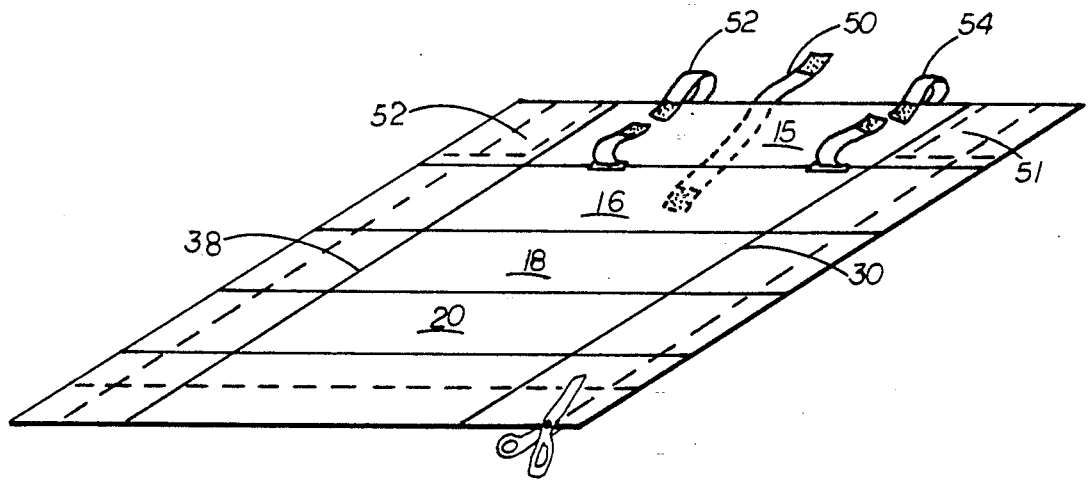
FIG. 1B is a perspective view of the invention in an unfolded and unattached condition.

Referring now to FIG. 1B, the invention is designed and constructed such that, using right visor 12 for illustrative purposes, panels 16, 18, and 20, horizontal outside fold 30, and horizontal inside fold 38 may be folded one upon another, and be secured by strap 50. Similarly, left visor 14 has panels 22, 24, and 26, horizontal outside fold 28, and horizontal inside fold 36 which can be folded and secured by a similar strap. Furthermore, each extended visor, left visor 14, or right visor 12, can easily be cut as illustrated in FIG. 1B, into virtually any size to be adapted to varied window sizes due to the material used to construct the visors 12 and 14, in the preferred embodiment of the invention, is cardboard, although numerous other materials would suffice. Cut away squares 51 and 52 may be discarded as not needed.

Figure 2:
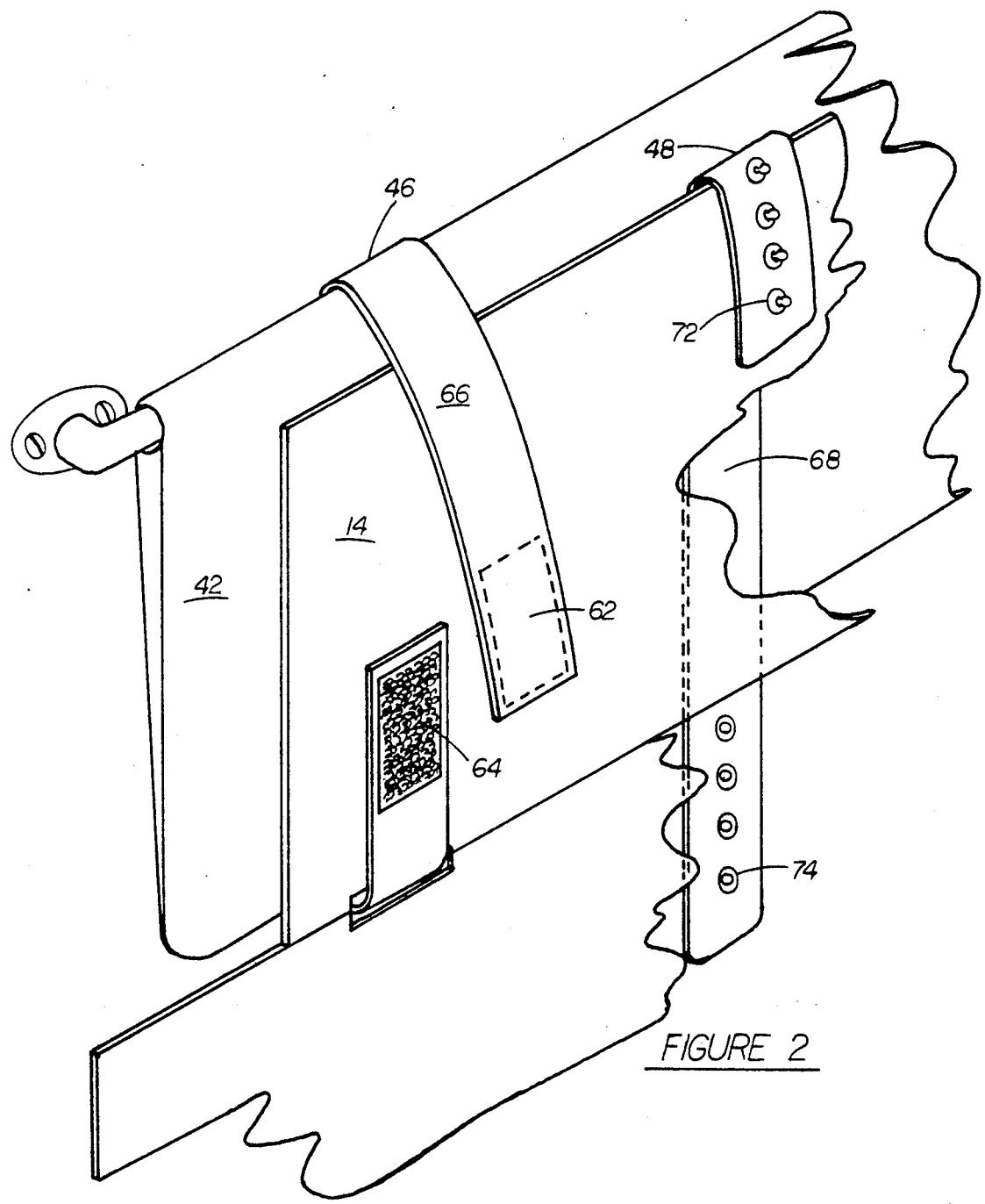
FIG. 2 illustrates the manner of attaching the invention to a conventional sun visor.

Referring to FIG. 2, a detailed view is given of two possible versions of flexible bands 46, 48, 50, and 52 used to secure left and right extended visors 12 and 14 to conventional vehicle sun visors 42 and 44 as discussed for the above detailed embodiment of the present invention. Shown is left extended visor 14 attached to left conventional sun visor 42 by flexible bands 46 and 48. Flexible band 46 may be either a cloth, rubber, nylon or plastic band 66 with Velcro pads 62 and 64 attached thereto, to secure left extended visor 14 to conventional sun visor 42. Alternately, flexible band 48 may be used to secure left extended visor 14 to conventional sun visor 42 wherein flexible band 48 may be a cloth, rubber, nylon or plastic band 68 which is secured to conventional vehicle sun visor 42 by male insert 72 mating with female receptacle 74. Here, the male/female arrangement can be a snap metal or plastic type arrangement or any similar male/female plug type arrangement. Again, to illustrate the numerous possibilities in securing the invention to conventional vehicle sun visor 42, flexible band 68 could be elastic, having fasteners at either end constructed from Velcro or male/female fasteners as discusses above. Furthermore, varied fasteners can be employed, with numerous possibilities available for flexible bands, yielding a vary large number of possibilities available for flexible bands yielding a very large number of possibilities of creating means for securing the invention to a vehicle sun visor.

Figure 3:
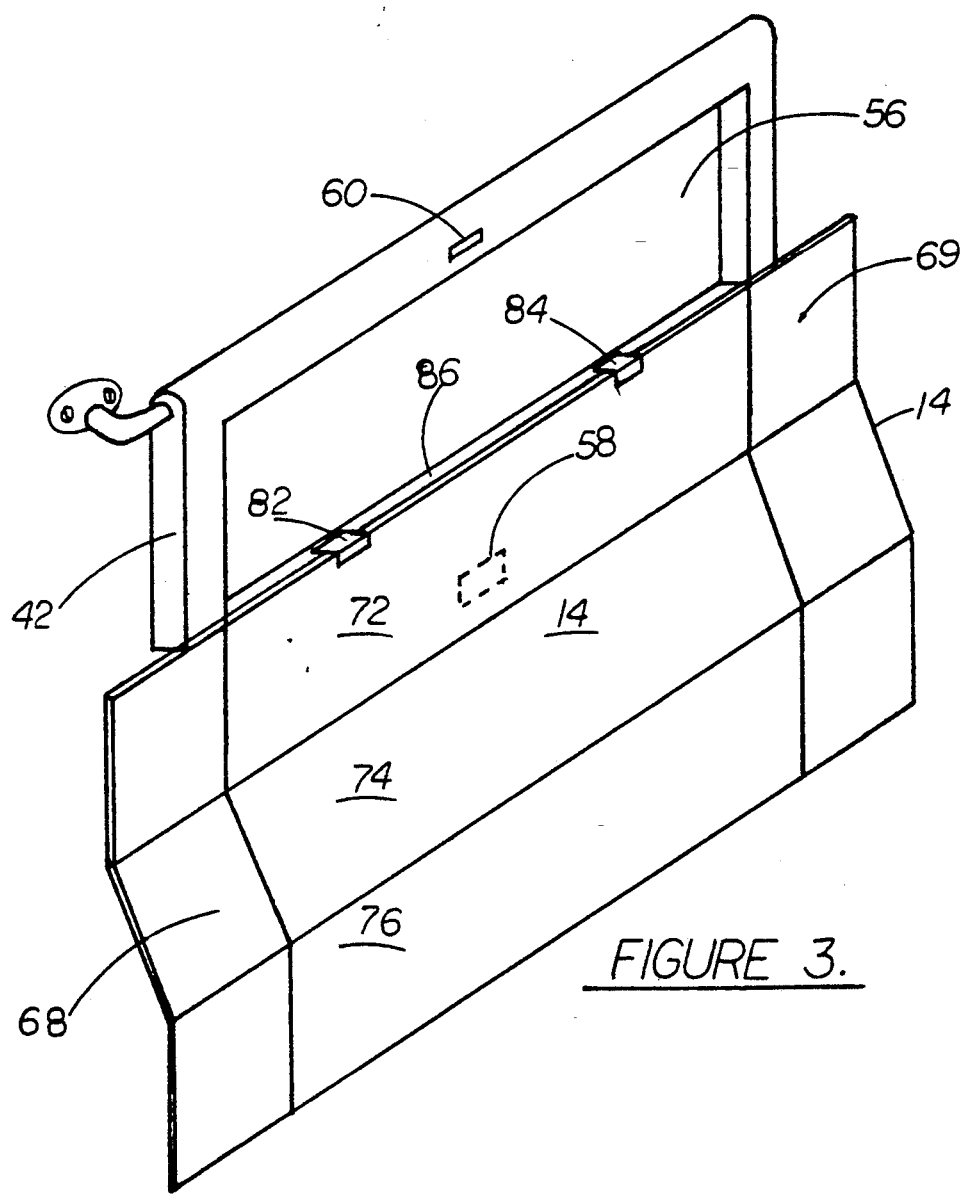
FIG. 3 illustrates the method of folding the visor and an alternate embodiment of the invention wherein the motor vehicle sun visor contains a recessed area into which the invention will fit when folded in its stored position.

Referring now to FIG. 3, an alternative version of the invention is illustrated, wherein left vehicle sun visor 42 is manufactured with a recess 56 contained therein into which foldable extended visor 14 may be inserted and stored during inoperative periods. Handle means 58 is provided on the back of center panel 72 to mate with latch assembly 60 to secure extended visor 14 within recess 56 during inoperative periods. Hinges 82 and 84 are attached to each the left extended visor 14 and inside rail 86 of recess 56. To close extended visor 14 into recess 56, left side panel 68 and right side panel 69 fold inwardly on top of center panels 72, 74, and 76, whereupon center panels 72, 74, and 76 then fold into recess 56 of vehicle sun visor 42. Handle means 58 then can engage latch assembly 60 to secure the invention in a folded position in a simple and effective manner, whereupon, the invention may be deployed in the future. By constructing left vehicle sun visor 42 with recess 56 contained within the visor itself, optimum convenience is obtained, making extending and storing of the invention simple, effective and not cumbersome to use.

In view of the above disclosure, many other variations and modifications of the invention as disclosed herein will become apparent to those skilled in the relevant arts. Therefore, these modifications should be seen as obvious variations of the invention as defined by the appended claims.

I claim:

1. A foldable sun visor shield for shielding at least a major portion of a vehicle windshield at least nearly from a top height to a bottom height of said windshield while said vehicle is parked, comprising:

a center planar visor means foldable along plural first spaced parallel fold lines, said center planar visor means having a top edge parallel to said first spaced parallel fold lines and a pair of side edge bounding said top edge and extending generally perpendicular thereto, said side edges extending at least nearly from said top height to said bottom height of said windshield;

attachment means for attaching said center planar visor means near said top edge to a support structure such as a windshield visor whereby to suspend said center planar visor means from said support structure;

at least one side planar visor means attached to said center planar visor means along a first one of said side edges of said center planar visor means, said first side edge of said center planar visor means being a first cantilever fold line extending vertically below said support structure along which said one side planar visor means is foldable with respect to said center planar visor means, said one side planar visor means being foldable along plural spaced parallel fold lines in said one side planar visor means which are co-linear with said plural spaced parallel fold lines of said center planar visor means, whereby said one side planar visor means is cantilevered from said center planar visor means along with first cantilever fold line whenever said one side planar visor means is unfolded with respect to said center planar visor means.

2. The foldable sun visor shield of claim 1 further comprising:

a second side planar visor means attached to said center planar visor means along the other one of said side edges of said center planar visor means, said other one of said side edges being a second cantilever fold line along which said second side planar visor means is foldable with respect to said center planar visor means, said second side planar visor means being foldable along plural spaced parallel fold lines in said second side planar visor means which are co-linear with said plural spaced parallel fold lines of said center planar visor means, whereby said second side planar visor means is cantilevered from said center planar visor means along said second cantilever fold line whenever said second side planar visor means is unfolded with respect to said center planar visor means.

3. The foldable sun visor shield of claim 1 wherein said center planar visor means and said side planar visor means are integrally formed together of a relatively stiff material which at least partially inhibits transmission of sun light therethrough.

4. The foldable sun visor shield of claim 3 wherein said relatively stiff material comprises a material of the type including cardboard, whereby said foldable sun visor tends to maintain its shape whenever it is folded or unfolded.

5. The foldable sun visor shield of claim 1 wherein said attachment means comprises means for attaching to at bottom edge of an automotive windshield visor.

6. The foldable sun visor shield of claim 5 wherein said plural parallel fold lines partition said center planar visor means into panels each corresponding in size to said automotive windshield visor and said plural parallel fold lines partition said side planar visor means into plural panels each of a size not exceeding that of said plural panels of said center planar visor means, whereby said center and side planar visor means are foldable together in a single package generally congruent with said automotive windshield visor.

7. The foldable sun visor shield of claim 6 further comprising means for holding said single package securely against said automotive windshield visor whenever said foldable sun visor shield is not in use.

8. The foldable sun visor shield of claim 1 wherein said side planar visor means is not attached to anything except said center planar visor means so as to be freely foldable with respect thereto.

9. The foldable sun visor shield of claim 2 wherein said center planar visor means and said second side planar visor means are unfoldable together so as to face at least one horizontal half of said automobile windshield.

10. The foldable sun visor shield of claim 9 wherein said one side planar visor means is unfoldable with said center planar visor means so that said one side planar visor means faces at least a portion of a side window of said automobile adjacent said windshield from a top height to a bottom height thereof.

11. The foldable sun visor shield of claim 1 wherein said center planar visor means and said one side planar visor means are fully unfolded about said plural parallel fold lines thereof when said one said planar visor means is in an acute orientation with respect to said center planar visor means.

* * * * *